March 3, 1970 W. W. STEWART 3,498,867

METHODS AND APPARATUS FOR SEATING ARTICLES

Filed Oct. 6, 1966

INVENTOR
W. W. STEWART
BY [signature]
ATTORNEY

United States Patent Office 3,498,867
Patented Mar. 3, 1970

3,498,867

METHODS AND APPARATUS FOR SEATING ARTICLES

William W. Stewart, Allentown, Pa., assignor to Western Electric Company, Incorporated, New York, N.Y., a corporation of New York Filed Oct. 6, 1966, Ser. No. 584,844
Int. Cl. B32b *31/12*
U.S. Cl. 156—295 9 Claims

ABSTRACT OF THE DISCLOSURE

An apparatus and a method for seating an article against a fluid adhesive covered substrate. The apparatus comprises three concentric pressure plungers which apply sequential pressure to the article in a first, second and third concentric areas of the article, radially outward of the central plunger.

This invention relates to methods and apparatus for seating articles onto an adhesive coated substrate, and in particular, to such methods and apparatus for seating semiconductor slices in fluid wax. Therefore, it is an object of this invention to provide new and improved methods and apparatus of such character.

Preparatory to the operation of polishing silicon or germanium slices, a slice is mounted on a planar support by an adhesive material, such as wax. In the past, the slice was manually placed on a mounting plate upon which fluid wax had been placed. An operator would use a cotton swab to press the slice against the mounting plate, forcing out the excess wax from under the slice. Quite often, one area of the slice would be pressed more than another area, resulting in a nonuniformly distributed layer of wax between the slice and the mounting plate. The nonuniformity caused the surface of the slice to be nonplanar, so that, upon polishing, a tapered or bowed condition resulted.

Another object of this invention, therefore, is to provide novel methods and apparatus for providing uniform seating of such slices on a mounting plate.

Silicon slices, suitable for subsequent manufacture into electronic components, are relatively thin wafers of material having a thickness in the neighborhood of 10 mils. Due to its brittle character, a slice tends to be fragile in ordinary handling. Undue stress can cause fracture.

Hence, another object of the invention is to provide improved methods and apparatus for seating the slice without causing fracture to occur.

In accordance with certain features of this invention, an article can be seated against a fluid adhesive covered substrate by sequentially applying pressure to first, second, and third enclosed concentric areas of the article, radially outward. Specifically, an article is mounted on a substrate covered with a flowable adhesive by initially placing the article on the substrate with a layer of the adhesive in flowable state therebetween. Subsequently, pressure is applied tending to force the article and substrate together sufficient to extrude a portion of the adhesive from between the article and the substrate, the pressure being applied in a progression of at least three steps commencing with a central portion of the article and extending outward.

A tool, suitable for applying such sequential pressure to affix a semiconductor slice to a planar substrate, includes a housing having a pair of concentric recesses, one recess being wider and shallower than the other. A cylindrical member, having a flange at one end, is adapted to have its flanged end reciprocate within the other recess against a first spring fitted therewithin. A washer fit within the one recess, restrains the cylindrical member. An annular member, having an inner diameter substantially equal to but slightly greater than the diameter of the cylindrical member to permit the cylindrical member to reciprocate therewithin, has a flanged end adapted to reciprocate within the one recess against a second spring, the second spring being adapted to surround the cylindrical member and fit within the one recess against the washer. An annular retaining ring, having an inner diameter equal to but slightly greater than the outer diameter of the annular member to permit reciprocation therebetween, is affixed to the housing to restrain the annular member.

Other objects, advantages, and features of this invention will become more apparent from the following description, when read in conjunction with the accompanying drawing, in which.

Figure 1:
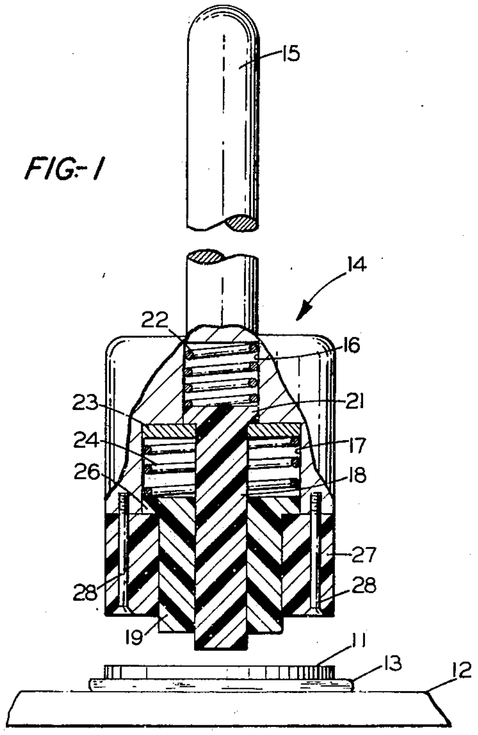
FIG. 1 is a front view, partly in section, of a hand tool, prior to partial engagement with a semiconductor slice in accordance with one embodiment of the invention.

As illustrated in FIG. 1, a semiconductor slice 11, such as germanium or silicon, is to be mounted on a substrate such as a mounting plate 12 (in preparation for a polishing operation) by an adhesive material such as fluid wax 13 having a sticky consistency, for example, ceresin.

It is believed that optimum adhesion occurs by initially applying pressure to a circular area in the center of the slice. Sequential pressure is then applied to larger concentric areas until pressure has been applied to the entire slice. Preferably, it is desired that such pressure be applied to the slice through the use of a hand tool designed for such purpose.

Referring to FIG. 1, there is shown such a hand tool 14, for performing the affixing or seating operation. The tool 14, which includes a handle 15, is formed with concentric recesses 16 and 17 for housing a pair of concentric plungers 18 and 19. A flanged end 21 of the primary central plunger 18 is urged by a spring 22, housed within the central recess 16, against a washer 23 which is fit within the outer concentric recess 17. A larger concentric spring 24 is housed within the outer recess 17 and is adapted to receive the primary plunger 18 for reciprocating movement therewithin. A flanged end 26 of the secondary concentric plunger 19 is urged by the concentric spring 24 against a retaining ring 27 which acts as a tertiary plunger. The retaining ring 27 is held by screws 28—28 in order to simplify replacement of parts, to interchange different sizes of components and/or to simplify repair.

OPERATION

Figure 2:
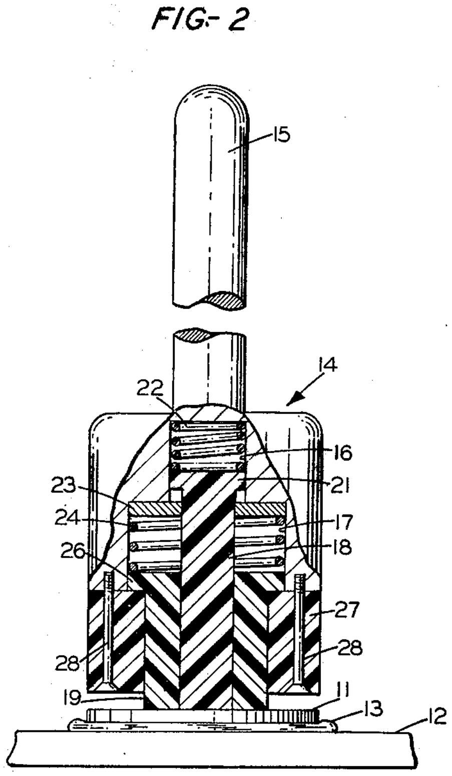
FIG. 2 is a view similar to FIG. 1, showing the tool in partial engagement with the slice.

In operation, the mounting plate 12 is heated to a temperature exceeding the melting temperature of the wax. A block of ceresin wax, preferably having a quartz base, is smeared over the heated plate 12, as uniformly as possible by hand, depositing a film of wax ranging from 20 to 50 mils in thickness. A slice 11 of semiconductor material, such as silicon, is placed onto the wax 13. An operator grips the handle 15 of the tool 14, and pushes it down against the slice, in vertical alignment such that the central plunger 18 is urged against the center of the slice 11. The pressure exerted by the central spring 22 causes the wax 13 to flow outward from beneath the slice, toward the periphery thereof. Continual pressure applied to the handle 15 causes the primary plunger 21 to be depressed until the secondary plunger 19 comes into contact with the slice 11, as illustrated in FIG. 2. The plungers 18 and 19, at this stage, present a flat concentric face to the surface of the slice 11. Continuing, as the handle 15 is further depressed, the forces exerted by the springs 22 and 24 cause the excess wax 13 to continue flowing from under the slice 11 toward the outer periphery.

Figure 3:
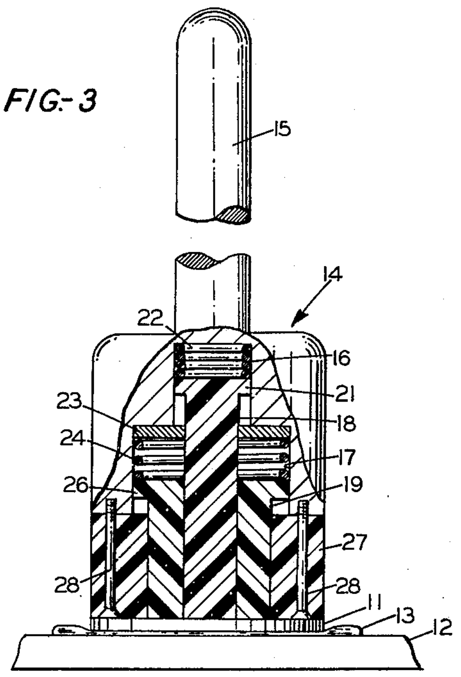
FIG. 3 is a similar view illustrating the tool in complete engagement with the slice.

As the hand tool 14 is further depressed, all three plungers 18, 19 and 27 finally contact the slice 11, as shown in FIG. 3. The coplanar faces of the plungers thereafter exert a force on the entire face of the slice 11, thereby forcing additional excess wax 13 to flow from under the slice 11 resulting in a uniform wax layer of desired thickness (e.g., 0.8 to 1.2 mils) between the slice 11 and the mounting plate 12.

Next, the tool 14 is removed, a weight is placed over the slice, and the fluid wax 13 is allowed to cool and to set to affix the slice 11 to the mounting plate 12. Thereafter, upon removal of the weight, the silicon slice 11 is polished by known techniques.

In a preferred embodiment of the invention, each of the plungers 18, 19 and 27 is made of a material having a low coefficient of friction, such as polytetrafluoroethylene. Such material is preferred so that the plungers freely slide within each other, and so that the slice 11 is not scratched or marred due to unnecessarily high frictional contact. Preferably, each of the springs 22 and 24 has a deflection constant exceeding 40 pounds per inch.

Through the use of the tool 14, described above, force initially is centrally applied to the slice 11 and is then extended in incremental amounts concentrically in a radial manner. By applying pressure in such a manner, the slice 11 is seated in the wax 13 and is substantially level with the mounting plate 12.

Due to the brittle quality of a silicon slice, great care should be taken to seat the slice properly. Hence, because it is easier to manipulate, a hand tool is more desirable than a fixture for seating silicon slices.

Although three concentric plungers have been described, greater numbers of concentric plungers can be used. Two concentric plungers, in general, do not give desirable results.

It is to be understood that the above-described embodiment is merely illustrative of the principles of the invention, and that other embodiments may be devised by persons skilled in the art which embody these principles and fall within the spirit and scope of the invention.

What is claimed is:

1. A method of seating an article against a fluid adhesive-covered substrate comprising sequentially applying pressure to first, second, and third enclosed concentric areas of the article, radially outward.

2. A method of mounting an article having a surface, on a substrate having a corresponding surface, with a flowable adhesive, which comprises:

placing the article on the substrate with said surfaces facing each other and with a layer of the adhesive in flowable state therebetween; and applying pressure tending to force the article and substrate together sufficient to extrude a portion of the adhesive from between the article and the substrate, the pressure being applied in a progression of at least three steps commencing with a central portion of the article and extending outward.

3. A method of affixing an article having a surface against a substrate, having a corresponding surface, covered with a fluid adhesive, comprising:

(a) placing the article on the substrate with adhesive between said surfaces;

(b) applying pressure to a first enclosed surface area of said article to force the article against said substrate;

(c) subsequently applying pressure to a second enclosed surface area of said article against said substrate; and (d) subsequently applying pressure to a last enclosed surface area of said article against said substrate; wherein at least a portion of the first surface area lies within the second surface area, and wherein at least a portion of the first and second surface areas each lie within the last surface area.

4. The method as recited in claim 3 wherein the entire first surface area lies within the second surface area, and wherein the entire second surface area lies within the last surface area.

5. The method as recited in claim 4 wherein all said surface areas are circular in shape and concentric.

6. The method as recited in claim 5 wherein said article is flat and said substrate has a planar surface.

7. Apparatus for mounting an article on an adhesive coated substrate, comprising:

(a) a housing;

(b) a first annular member;

(c) a second annular member, adapted to reciprocate within said first annular member in mating relationship therewith;

(d) a circular rod-shaped member adapted to reciprocate within said second member in mating relationship therewith;

(e) means for affixing said first member to said housing;

(f) a first spring bias means for urging said second member from said housing; and (g) a second spring bias means for urging said circular member from said housing.

8. Apparatus for affixing a semiconductor slice, made from an element selected from the group consisting of germanium and silicon, to an adhesive coated planar substrate, comprising:

(a) a housing having a pair of concentric recesses, one recess being wider and shallower than the other;

(b) a first spring adapted to fit within said other recess;

(c) a substantially cylindrical member having a fixed diameter, and having a flange at one end thereof, said flanged end adapted to reciprocate within said other recess against said spring;

(d) a washer adapted to fit within said one recess and to restrain said cylindrical member;

(e) a second spring adapted to surround said cylindrical member, and fit within said one recess against said washer;

(f) a first substantially annular member having an inner diameter substantially equal to but slightly greater than said fixed diameter, having an outer diameter, and having a flange at one end thereof, the flanged end being adapted to reciprocate within said one recess against said second spring, said cylindrical member being adapted to reciprocate within said anular member; and (g) an annular retaining ring having an inner diameter substantially equal to but slightly greater than said outer diameter, affixed to said housing to restrain said annular member, said annular member being adapted to reciprocate within said retaining ring.

9. Apparatus as recited in claim 8 wherein said cylindrical member, said annular member, and said retaining ring, each consist of polytetrafluoroethylene.

References Cited

UNITED STATES PATENTS

| | | | |
|---|---|---|---|
| 1,537,753 | 5/1925 | Craven | 72—403 |
| 2,280,359 | 6/1939 | Trudell | 72—54 |
| 2,954,068 | 9/1960 | Williamson | 72—397 |
| 3,173,202 | 3/1965 | Farber | 29—497.5 X |

ROBERT F. STAHL, Primary Examiner

U.S. Cl. X.R.

29—497.5; 72—397, 403